C. N. SCOTT.
OIL WELL SCREEN.
APPLICATION FILED NOV. 1, 1916.
1,272,540.
Patented July 16, 1918.
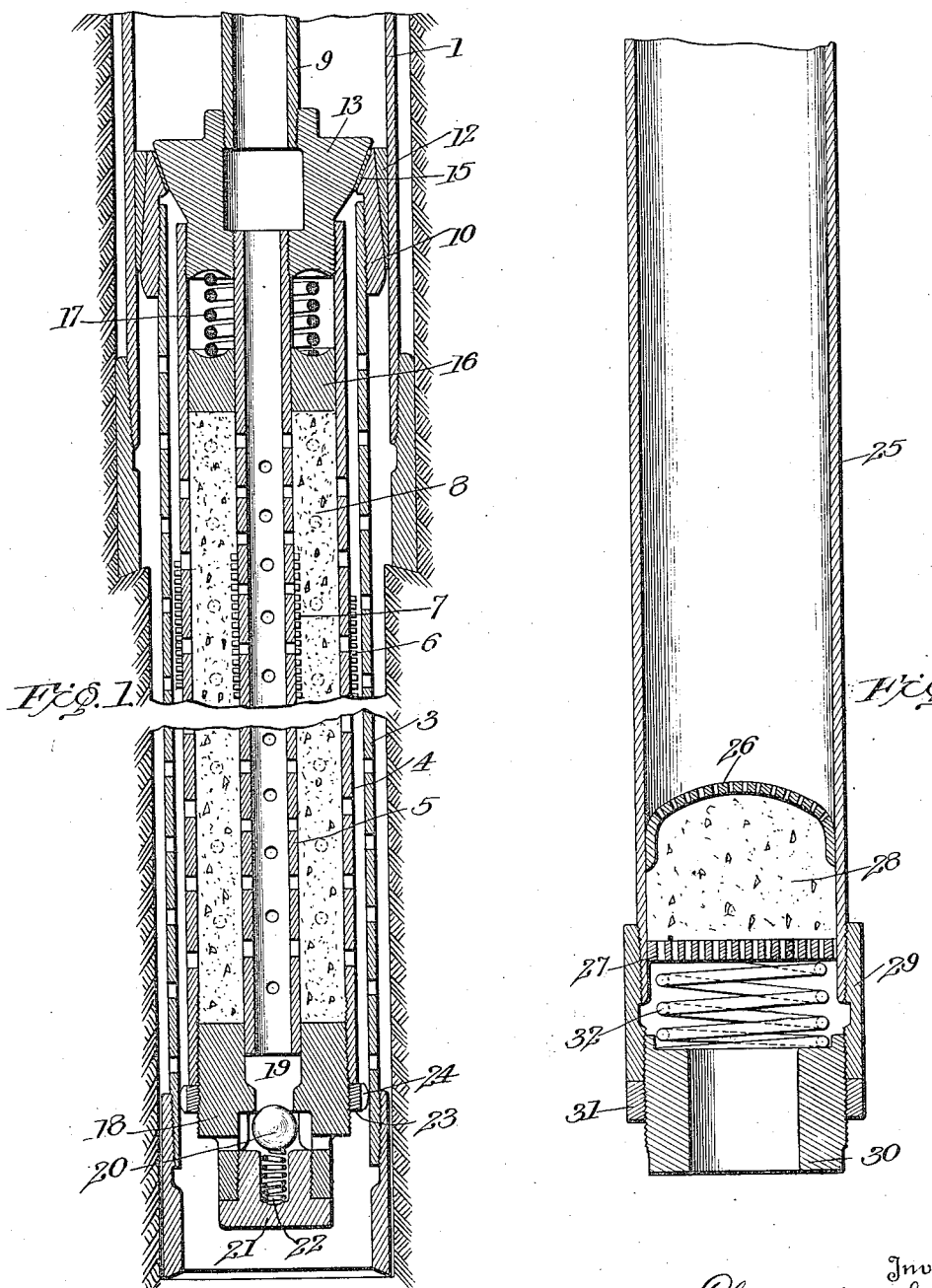
Witness
G. T. Baker
Inventor
Clarence N. Scott
By Foster Freeman Watson & Coit
Attorney

UNITED STATES PATENT OFFICE.

CLARENCE N. SCOTT, OF HOUSTON, TEXAS, ASSIGNOR TO PRODUCERS OIL COMPANY, OF HOUSTON, TEXAS, A CORPORATION OF TEXAS.

OIL-WELL SCREEN.

REISSUED

1,272,540.

Specification of Letters Patent.

Patented July 16, 1918.

Application filed November 1, 1916. Serial No. 128,946.

*To all whom it may concern:*

Be it known that I, CLARENCE N. SCOTT, a subject of the King of Great Britain, residing at Houston, Harris county, State of Texas, have invented certain new and useful Improvements in Oil-Well Screens, of which the following is a specification.

This invention relates to new and useful improvements in an oil or gas well strainer. Strainers or screens at present in general use in oil and gas wells are constructed of metal, having slots through which the oil and gas pass. The slots are usually very narrow and the coarser sands are held back and prevented from passing through into the interior of the strainer. In many wells, however, there is much fine and floating sand which, by reason of its fineness, the strainer or screen will not hold back, and, in such cases, the fine sand passing with the oil and gas through the strainer or screen, as at present constructed of metal, cuts out the metal walls of the slots, gradually increasing the width of the slots until the utility of the strainer is destroyed and the well fills up with coarse sand then admitted.

The object of the invention is to provide a strainer or screen, of the character described, wherein the passage of fine sand with the oil and gas, from the oil and gas stratum, to the well, will be to a certain degree obstructed by a hard substance having greater ability to resist the eroding action of the sand, passing through the strainer or screen, than the metallic walls of such strainers or screens in present use.

In the strainer or screen which is the subject of this application, the passage of the oil, gas and fine sand is through the interstices formed between the granular particles of carborundum or other hard or suitable substance, and the passing of the coarser sand is obstructed, resisted and controlled by said granular particles.

With the above and other objects in view the invention has particular relation to certain novel features of construction, arrangement of parts and use, an example of which is given in this specification and illustrated in the accompanying drawings, wherein:

Figure 1 is a vertical sectional view of the screen, and

Fig. 2 is a vertical sectional view of a modified form thereof.

Referring now more particularly to the drawings, wherein like numerals of reference designate similar parts in each of the figures, the numeral 1 designates a well casing which is set in the bore and which extends down well toward the bottom thereof. The bore is usually contracted below the lower end of this casing, forming an annular shoulder which supports the casing, the lower or contracted part of the bore extending through the oil strata and receiving the perforated liner 3, as shown in Fig. 1. The screen proper comprises two concentrically arranged foraminous pipes 4 and 5, each of which has a plurality of perforations or slots to permit the free inflow of fluid and may be wrapped with screen wire as 6 and 7 in the well known manner, said wire being secured to the outer side of said pipes in any preferred manner and the spirals or turns thereof, being spaced apart, forming slits through which the fluid and sands may enter but which prevent the escape of the granular particles of carborundum or other material placed to be retained between pipes 4 and 5. Said pipes 4 and 5 are to be wrapped with wire from end to end although in the drawing only a section of each is shown so wrapped; or the perforations or slots in the pipes 4 and 5 may be sufficiently small as to require no wire wrapping. The perforated liner 3 fits comparatively closely over the screen pipe 4 but the inner screen pipe 5 is spaced a considerable distance from the pipe 4, being considerably smaller in diameter, so as to provide an intervening space for the aggregate 8, which is composed preferably of small particles of carborundum. The oil passing through the screening pipe 4 is freed of the greater part of the coarse sand and detritus therein and enters the inner screen pipe 5 and is delivered through the tube 9 to the surface of the ground. The upper end of the pipe 3 is threaded into a collar 10 which is secured in the lower end of the casing 1 by means of a lead seal 12. The upper end of the collar 10 flares outwardly and supports the coupling member 13 and interposed between this coupling member and the collar is the gasket 15 formed of leather or other suitable material. The lower end of the coupling 13 is reduced and outwardly threaded and receives the upper end of the screen pipe 4 and said coupling has a central passageway therethrough into which the screen pipe 5 and the alined tube 9 are threaded as shown. Surrounding the screen pipe 5 near its upper end and resting against the aggregate 8 is an annular collar 16, interposed between which and the coupling 13 is a coil spring 17 which holds said collar against said aggregate to keep the same closely packed. Threaded into the lower end of the pipe 4 is a valve seat 18 having a fluid passageway 19 therethrough which is controlled by the ball valve 20. The passageway 19 separates into a plurality of radiating passageways below said seat. Into the lower end of the seat 18 a plug 21 is screwed, having a coil spring 22 which normally rests against the valve 20 and holds the same closed and prevents the admission of oil from beneath, up through the passageway 19. A ring nut 23 is threaded onto the seat 18 and has a plurality of spacers 24 spaced apart which hold the pipe 4 centered and the lower end of the screen pipe 5 projects into the passageway 19 of the seat and said pipe is thereby held centered relative to the screen. In case it is desired to wash the screen out, water is forced down through the tube 9 and the pressure thereof unseats the valve 20 and permits the fluid to pass out through the lower end of the screen and up and out through the annular space between pipes 3 and 4 when the member 15 is raised off of its seat.

In Fig. 2, I have shown a modified form of screen wherein the numeral 25 indicates a pipe which has a foraminous or perforated plate 26 fixed therein and spaced underneath this plate is a foraminous or perforated disk 27. Interposed between said plate and disk is a quantity of aggregate 28 preferably composed of small particles of carborundum. Secured onto the lower end of pipe 25 is a collar 29 whose lower end receives a gland 30 which is held in position by means of the locking ring 31. Interposed between the gland 30 and the disk 27 is a strong coil spring 32 which operates against said disk and holds the aggregate 28 closely packed together. In this form of screen, the oil flows through the perforations in the disk 27 and percolates through the aggregate 28 and passes thence through the perforations of the plate 26 into the pipe 25 and thence to the surface of the ground as hereinbefore explained. The foreign particles carried by the oil will be opposed by the carborundum which will withstand the erosion thereof and relieve the walls of the perforations of the metal of the erosive and disintegrating action of said particles.

Having thus described the invention, what is claimed and desired to be secured by Letters Patent is:

1. The combination of a pipe adapted to extend into a well and deliver liquid or gas therefrom normally closed at its lower end but having a foraminous portion near that end, with a foraminous pipe surrounding and concentric with the foraminous portion of said first mentioned pipe, a closely packed filling of fine hard material between said foraminous portions, and a spring pressed collar between said pipes bearing on said granular material to keep it closely packed.

2. The combination of a well casing having an interior collar near the bottom, with a perforated pipe extending downwardly from said collar, a conducting pipe extending into said casing having a surrounding collar resting on said first mentioned collar, a foraminous section constituting a continuation of said conducting pipe below said collars, a foraminous pipe spaced from and surrounding the foraminous portion of said foraminous section, a closely packed filling of fine hard granular material between said foraminous pipes, and an outwardly opening automatic valve at the lower end of the foraminous section of said conducting pipe.

3. The combination of a well casing having an interior collar near the bottom, with a perforated pipe extending downwardly from said collar, a conducting pipe extending into said casing having a surrounding collar resting on said first mentioned collar, a foraminous section constituting a continuation of said conducting pipe below said collars, a foraminous pipe spaced from and surrounding the foraminous portion of said foraminous section, a closely packed filling of fine hard granular material between said foraminous pipes, and means for exerting a yielding pressure on said filling to keep it tightly packed.

4. The combination of a well casing having an interior collar near the bottom, with a perforated pipe extending downwardly from said collar, a conducting pipe extending into said casing having a surrounding collar resting on said first mentioned collar, a foraminous section constituting a continuation of said conducting pipe below said collars, a foraminous pipe spaced from and surrounding the foraminous portion of said foraminous section, a closely packed filling of fine hard granular material between said foraminous pipes, and a spring pressed collar between said foraminous section and surrounding foraminous pipe bearing on the upper surface of said filling material.

5. The combination with a tubular well casing having an inwardly extending tapering seat on its interior near the bottom, of a conducting pipe extending into said casing having an external tapering seat fitting and making close joint with said seat on said casing, concentric foraminous tubular extensions of said conducting pipe below said seats, a closely packed filling of hard fine granular material between said concentric foraminous extensions, means for closing the lower end of said extensions, and an automatic outwardly opening valve in said closure at the lower end of the inner concentric extension.

6. The combination with a tubular well casing having an inwardly extending tapering seat on its interior near the bottom, of a conducting pipe extending into said casing having an external tapering seat fitting and making close joint with said seat on said casing, concentric foraminous tubular extensions of said conducting pipe below said seats, a closely packed filling of hard fine granular material between said concentric foraminous extensions, means for closing the lower end of said extensions, and a spring pressed ring at the upper ends of said foraminous extensions bearing on said granular material to keep it closely packed.

In testimony whereof I affix my signature.

CLARENCE N. SCOTT.